(12) United States Patent
Plant et al.

(10) Patent No.: US 9,742,104 B2
(45) Date of Patent: Aug. 22, 2017

(54) UNDERWATER CONNECTING APPARATUSES AND ASSEMBLIES

(71) Applicants: Christopher Plant, Lancaster (GB); Mark Simmonds, Ulverston (GB); Stephen Ward, Ulverston (GB)

(72) Inventors: Christopher Plant, Lancaster (GB); Mark Simmonds, Ulverston (GB); Stephen Ward, Ulverston (GB)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 14/013,531

(22) Filed: Aug. 29, 2013

(65) Prior Publication Data

US 2014/0073176 A1    Mar. 13, 2014

Related U.S. Application Data

(60) Provisional application No. 61/694,847, filed on Aug. 30, 2012.

(30) Foreign Application Priority Data

Aug. 30, 2012   (GB) .................................. 1215454.8

(51) Int. Cl.
   *H01R 13/523*   (2006.01)
   *G02B 6/44*   (2006.01)

(52) U.S. Cl.
   CPC ......... *H01R 13/523* (2013.01); *G02B 6/4427* (2013.01)

(58) Field of Classification Search
   CPC ............................ G02B 6/4427; H01R 13/523

USPC ....... 439/519, 199, 201, 204, 521, 575–585, 439/271–275
See application file for complete search history.

(56) References Cited

U.S. PATENT DOCUMENTS

| | | | |
|---|---|---|---|
| 3,759,988 A | 9/1973 | Kunstle et al. | |
| 3,980,369 A | 9/1976 | Panek | |
| 5,645,442 A | 7/1997 | Cairns | |
| 6,315,461 B1 * | 11/2001 | Cairns | ............................ 385/56 |
| 7,429,193 B2 * | 9/2008 | Cairns | .................. H01R 13/521 |
| | | | 439/271 |
| 7,959,454 B2 * | 6/2011 | Ramasubramanian et al. | ............................. 439/201 |

(Continued)

FOREIGN PATENT DOCUMENTS

| | | |
|---|---|---|
| EP | 0902505 | 3/1999 |
| GB | 2192316 | 1/1988 |
| WO | WO0140837 | 6/2001 |

OTHER PUBLICATIONS

European Search Report and Written Opinion cited in EP13178310, mailed Sep. 18, 2013.

(Continued)

*Primary Examiner* — Renee Luebke
*Assistant Examiner* — Paul Baillargeon
(74) *Attorney, Agent, or Firm* — Lempia Summerfield Katz LLC (57) ABSTRACT

Underwater connecting apparatuses include a flexible diaphragm that at least in part defines a wall of a chamber configured to contain a fill material, the wall having a perimeter with a non-circular profile when the chamber is viewed in cross-section. The non-circular profile of the perimeter is configured to allow a volume of the chamber to change without substantially changing a length of the perimeter.

15 Claims, 6 Drawing Sheets

(56) References Cited

U.S. PATENT DOCUMENTS

2008/0227322 A1* 9/2008 Nicholson .................... 439/271
2011/0150394 A1   6/2011 Sorensen et al.

OTHER PUBLICATIONS

Great Britain Search Report cited in GB1215454.8, mailed Dec. 31, 2012.

* cited by examiner

UNDERWATER CONNECTING APPARATUSES AND ASSEMBLIES

RELATED APPLICATIONS

This application claims the benefit of U.S. Provisional Application No. 61/694,847, filed Aug. 30, 2012, and claims the benefit of Great Britain Patent Application No. GB 1215454.8, filed Aug. 30, 2012. The entire contents of both documents are hereby incorporated herein by reference.

TECHNICAL FIELD

The present teachings relate generally to apparatuses and assemblies for underwater cable termination and for underwater connecting.

BACKGROUND

An underwater cable may terminate at a bulkhead of a subsea installation, at the back end of an underwater connector, or at a harness that provides an intermediate unit between a cable and another cable or subsea installation or connector. In some cable termination assemblies, a seal is formed at the rear of a cable termination chamber housing to seal against the cable jacket. In such cable termination assemblies, the interior of the housing is thereby separated from ambient water to the rear or from oil contained in a hose accommodating the cable. The seal is formed of a relatively hard plastic cone having an aperture through which the cable jacket extends, and a radially inwardly facing surface for sealing against the jacket. The cone has a radially outwardly facing conical surface engaged by a radially inwardly facing conical surface of a seal energizing member. The seal energizing member is urged axially towards the cone member so as to compress it radially inwardly and form a seal with the cable jacket.

Another type of sealing configuration for use in cable termination assemblies provides a seal between axially adjacent chambers into which the cable extends. Each chamber contains a fluid (e.g., oil or gel) and is pressure balanced with respect to outside pressure by having a flexible wall. The outside of the flexible wall is exposed directly or indirectly to the outside environment. In order to separate the fluid in the two chambers, a pair of back-to-back seals is provided. The cable passes through an aperture in a hard plastic seal holder. At each axially opposite side of the seal holder, a first part of a respective elastomeric seal member engages and seals against the cable jacket, and a second part of the seal member engages and seals against an axial extension of the seal holder.

SUMMARY AND DESCRIPTION

The scope of the present invention is defined solely by the appended claims, and is not affected to any degree by the statements within this summary.

In a first aspect, cable termination apparatuses and assemblies for an underwater cable are provided that have an improved sealing configuration for a chamber of a cable termination housing.

Cable termination apparatuses for an underwater cable in accordance with the first aspect include a cable termination housing having a chamber into which a cable may extend in use, and an annular seal member configured to engage in use with a cable to create a seal between the chamber and a region outside of the chamber. The annular seal member includes a first annularly and axially extending portion configured to engage with the cable, and to extend axially along the cable and inwardly into the chamber. The first portion of the annular seal member is exposed to pressure in the chamber. A second annularly and axially extending portion of the annular seal member is configured to engage with the cable and to extend axially along the cable away from the chamber. The second portion of the annular seal member is exposed to pressure in the region outside the chamber.

In use, the first portion of the annular seal member is exposed to the pressure inside the chamber of the cable termination housing, and the second portion of the annular seal member is exposed to pressure in the region outside the chamber (e.g., that of ambient water, an adjacent chamber, or fluid provided in a hose that accommodates the cable). In each case, the pressure may urge the respective annularly and axially extending portion against the cable to form a seal.

In the cone sealing configuration described above, a good seal is obtained by energizing the cone member and compressing the cone member radially inwardly onto the cable jacket. However, as a result of this compression, the jacket may soften with a resultant loss of seal integrity over time due to a phenomenon known as "compression set." In some embodiments, the seal provided by the annular seal member in accordance with the first aspect may impose a relatively low radial load on the cable jacket, thereby reducing the risk of compression set.

In the back-to-back sealing configuration described above, the pressure in the chambers on each side of the sealing configuration adjusts to the increased external pressure when the assembly is used at depth. However, since the seal support is assembled onto the cable jacket at atmospheric pressure, there may be a tendency as the pressure in the chambers increases for each elastomeric seal to be pushed under the seal holder by the pressure differential. In this way, the elastomeric seal may force itself between the cable jacket and the seal holder and break. As a result of any break in the seal between the two chambers, any leakage of water into the outer chamber (e.g., due to loss of integrity of the seal between that chamber and ambient) may also pass into the inner chamber. By using a sealing configuration in accordance with a first aspect of the present teachings, the use of a seal holder between two back-to-back seals may be avoided.

In some embodiments, the underwater cable termination apparatus may be configured for electrical signal or data transmission. In some embodiments, the underwater cable termination apparatus may be configured to handle relatively low voltages (e.g., a peak or maximum of 1 kV or less). In some embodiments, the underwater cable termination apparatus may be configured for electrical power transmission. In some embodiments, the underwater cable termination apparatus may be configured to handle alternating root mean square (RMS) voltages (e.g., up to 5 or 10 or 20 or 30 or 40 or 50 or 60 or 70 or 80 or 90 or 100 or 110 or 120 or 130 or 140 kV or above).

In some embodiments, the underwater cable termination apparatus may be configured for optical transmission (e.g., via optical fibres). The cable may include optical fibres and/or electrical conductors.

In some embodiments, the annular seal member is a one-piece seal member.

In some embodiments, when in use, the annular seal member is configured to engage in a sealing manner with a jacket of a cable.

In some embodiments, each of the first axially extending portion and the second axially extending portion has a diameter that, in an unstressed condition of the respective portions, is smaller than the diameter of, for example, the cable jacket with which the first axially extending portion and the second axially extending portion are configured to engage. The first axially extending portion and the second axially extending portion may be stretched in a circumferential direction when the annular seal member is deployed on the cable. The amount of stretching, and the resultant radial inward force on the cable, is selected to minimize the tendency for the annular seal member to cause compression set (e.g., of the cable jacket). The stretching configuration avoids the use of any other mechanical component to effect sealing onto the cable. The respective pressures inside and outside of the chamber (e.g., the pressures of gel, oil or water) on the first axially extending portion and the second axially extending portion may contribute to sealing efficacy.

The respective lengths of the first portion and the second portion in the axial direction may be selected to spread the radially inward stress on the cable as needed. In some embodiments, the length of the first portion or the second portion may be at least 2 or 4 or 6 or 8 or 10 or 15 or 20 or 25 or 30 or 35 or 40 mm.

The first portion and the second portion may be thin as measured in a radial direction. As a result, the first portion and the second portion may be deformable and make good sealing contact with the cable without placing too much radially inward stress on the cable. In some embodiments, the thickness of the first portion and/or the second portion, considered at a position where the first portion and the second portion extend axially away from each other, may be less than 5 or 4 or 3 or 2 or 1 mm. In some embodiments, if an intermediate annularly extending portion is provided, the thickness of the first portion and/or the second portion, as measured in a radial direction at a region where the respective portion joins the intermediate portion, may be less than the thickness of the intermediate portion, as measured in the axial direction of the cable.

The first portion may have a radially outwardly facing surface configured to be exposed to pressure in the chamber. The second portion may have a radially outwardly facing surface configured to be exposed to pressure in the region outside of the chamber.

The annular seal member may include an intermediate annularly extending portion located between the first and second portions. The intermediate portion may be configured to be exposed on one axial side to pressure in the chamber and on an opposite axial side to pressure in the region outside the chamber. The intermediate portion may extend radially outwardly of the first portion and the second portion. In some embodiments, the intermediate portion may extend radially outwardly in a direction normal to the axial direction. In other embodiments, the intermediate portion may extend radially outwardly in a direction having both a component normal to the axial direction and a component in the axial direction. The intermediate portion may form a wall of the chamber (e.g., an axial end wall).

The annular seal member may have an annularly extending part configured to form a seal with respect to a wall of the housing. The annularly extending part may be in the form of a bead, a lip, or the like. The annularly extending part may be longer in the axial direction than in the radial direction. The annularly extending part may be at a location that is spaced radially outwardly from the radial location of the first portion and the second portion. The annularly extending part may be located radially outwardly of the first annularly and axially extending portion, radially outwardly of the second annularly and axially extending portion, or radially outwardly of a position from which the first portion and the second portion extend axially away from each other.

The annularly extending part may be gripped in a recess to provide effective sealing between the annular seal member and the housing wall. In some embodiments, the recess is generally T-shaped when viewed in axial cross-section. The annularly extending part may be gripped by being compressed in the axial direction.

The annularly extending part may be gripped between a pair of ring members. The ring members may be respective parts of a seal holder. The ring members may together form the recess in which the annularly extending part is gripped. The ring members may be urged together in the axial direction (e.g., by a locking ring).

The annularly extending part may seal directly to the housing wall. In some embodiments, the annularly extending part is sealed to a seal holder that, in turn, is sealed to the housing wall. If a seal holder is provided in two parts, one part may be integral with the wall of the housing. In some embodiments, both parts of a two-part seal holder are provided separately. A first seal holder part may be secured to the wall of the housing (e.g., with a screw). A screw thread may be provided around the outer circumference of the first seal holder part, and a corresponding screw thread may be provided around an inner peripheral surface of the housing wall. The seal holder part may be configured to be urged axially against a shoulder in the housing wall. An annular seal (e.g., an O-ring or the like) may be provided between the shoulder and the seal holder part.

A second seal holder part may be configured to be urged axially towards the first seal holder part (e.g., by the locking ring described above). The first seal holder part and the second seal holder part may be configured to compress the annularly extending part when the second seal holder part is urged towards the first seal holder part.

The annular seal member may be part of an axially extending flexible diaphragm that includes an axially extending wall of the chamber. The wall may be at a radially outer position compared to the radial positions of the first annularly and axially extending portion and the second annularly and axially extending portion. In some embodiments, the wall may be substantially cylindrical. In some embodiments, the wall may be substantially conical.

In some embodiments, the pressure in the termination housing chamber of an apparatus is balanced to external pressure by a suitable configuration, such as a flexible diaphragm that forms a wall of the chamber. The flexible diaphragm may be a separate component from the annular seal member, or the flexible diaphragm may be provided as part of the same component, as described above. The pressure in the region outside the chamber may be the pressure of ambient water, the pressure of an adjacent chamber, or the pressure in a hose that accommodates the cable. For an adjacent chamber or a hose, the pressure may be adjusted to ambient conditions. Thus, in some embodiments, there will be little or no pressure difference between the chamber and the region that the chamber separates. The annular seal member may thus form a good seal between the termination housing chamber and the region on the other axial side of the seal member due to the pressure on the respective axially extending portions.

The cable termination housing may have a second chamber into which, in use, the cable may extend. In such embodiments, the annular seal member may be configured to seal between the first chamber and the second chamber.

The second chamber may be pressure balanced to external pressure, for example by having a flexible diaphragm that forms a wall of the second chamber.

In some embodiments, the chamber (or each chamber in the case of multiple chambers) is filled with a fluid (e.g., oil or gel).

In some embodiments, a cable termination assembly is provided that includes an apparatus as described herein. The cable may extend into the chamber or into each chamber in the case of multiple chambers.

The first axially extending portion and the second axially extending portion of the annular seal member may each have a diameter that, in an unstressed condition of the respective portions, is smaller than the diameter of the cable (e.g., the cable jacket), engaged therewith.

In a second aspect, underwater connecting apparatuses are provided that have an improved flexible diaphragm. The improved flexible diaphragm defines a wall of a chamber filled with fill material.

Underwater cable termination apparatuses and underwater connectors in which a protected environment is provided around, respectively, an area where a cable is to be terminated or an area where a contact terminal of one connector part engages with a contact terminal of another connector part are known. The protected environment may be provided in a chamber having a wall formed by a boot or flexible diaphragm. The boot is filled with a fill material (e.g., an oil, a gel, or other fluid). The outside of the boot is exposed to ambient pressure, and since the boot is flexible, the book provides pressure balancing between the inside of the chamber and the outside of the chamber. An example of such a boot is shown in GB 2192316A directed to underwater electrical connectors.

The conventional boot has a cylindrical configuration such that the chamber has a circular perimeter when viewed in cross section. The boot may be filled with oil in a workshop at room temperature. The boot may then be taken to an offshore deployment site where the local temperature may be higher or lower. Since the apparatus may be used on a deck of a ship in hot sunshine, the apparatus should be able to accommodate thermal expansion of the fill material that causes the chamber to enlarge and the boot to expand and stretch in a radially outward direction. The apparatus may then be deployed under water (e.g., subsea), where the water may be at a temperature of 5° C. or lower in some parts of the world. When deployed subsea, the apparatus may be subject to pressures that are much higher than atmospheric. The reduction in temperature and the increase in pressure both tend to cause the fill material in the boot to contract in volume, such that the boot deflects in the radially inward direction. In the case of an underwater connector, where male contact pins enter into the chamber to establish an electrical connection, the volume of material in the chamber increases, and the flexible boot responds by deflecting in the radially outward direction.

In a second aspect, an underwater connecting apparatus is provided that includes a flexible diaphragm. The flexible diaphragm defines a wall of a chamber containing a fill material. The wall has a perimeter with a non-circular profile when the chamber is viewed in cross-section. The non-circular profile allows the volume of the chamber to change without substantially changing the length of the perimeter.

In such a configuration, the flexible diaphragm may permit the volume of the chamber to change in response to changes in the surrounding conditions without itself undergoing any significant stretching. As a result, an improved pressure balance between external and internal pressure may be achieved. By contrast, in a conventional apparatus, the resistance of the cylindrical boot to stretching when a volume change occurs results in the creation of a pressure differential between the outside and the inside, with the outside pressure being greater than the inside pressure. However, a function of the boot is to balance the pressures to be as close to equal as possible. If the external pressure is greater than the internal pressure, then water or other contaminants are more likely to leak into the protected environment within the boot. For example, in a conventional apparatus, if the external pressure is 300 bar, the internal pressure may be 290 bar. By using an underwater connecting apparatus in accordance with the second aspect, a lower pressure differential may be achieved. For example, in some embodiments, the pressure differential may be as low as 0.1 bar (e.g., when using oil as the fill material). In some embodiments, the pressure differential may be as low as one or two bars (e.g., when using gel as the fill material).

A benefit of minimizing the change in length of the perimeter of the flexible diaphragm wall is that by reducing the amount of stretching, the likelihood of material degradation over time (e.g., caused by fatigue) decreases.

In some embodiments, the underwater connecting apparatus may be configured for electrical signal or data transmission. In some embodiments, the underwater connecting apparatus may be configured to handle relatively low voltages (e.g., such as a peak or maximum of 1 kV or less). In some embodiments, the underwater connecting apparatus may be configured for electrical power transmission. In some embodiments, the underwater connecting apparatus may be configured to handle alternating root mean square (RMS) voltages (e.g., up to 5 or 10 or 20 or 30 or 40 or 50 or 60 or 70 or 80 or 90 or 100 or 110 or 120 or 130 or 140 kV or above).

In some embodiments, the underwater connecting apparatus may be configured for optical transmission (e.g., via optical fibres). In some embodiments, the cable may contain optical fibres and/or electrical conductors.

In some embodiments, the underwater connecting apparatus may be an underwater connector. The underwater connector may include a first connector part configured to be interengaged with a second connector part to effect an electrical connection and/or an optical connection. The connection may take place between respective electrical conductors and/or optical conductors. The electrical conductors may be contact terminals. In some embodiments, the apparatus may include a contact terminal (e.g., a contact socket). In some embodiments, the connector may be a wet mateable connector (e.g., a connector that may be mated underwater). In other embodiments, the connector may be a dry mate connector (e.g., a connector that is mated in dry conditions and then submerged in water).

The underwater connecting apparatus may provide a cable termination. By way of example, the cable termination may be used for terminating a cable to another item (e.g., the back of a connector part), a bulkhead, or a cable harness for connecting one cable to another. The cable may extend into the chamber. The apparatus may include an electrical conductor and/or an optical conductor to which a second electrical conductor and/or a second optical conductor belonging to a cable is to be connected. The electrical conductor may be a contact terminal for engaging the second electrical conductor of the cable (e.g., a crimp sleeve).

In some embodiments, the fill material in the chamber may be a fluid (e.g., oil or gel).

In some embodiments, the chamber extends in an axial direction, and the non-circular perimeter is transverse to the axial direction as viewed in cross section.

In some embodiments, the chamber may be substantially cylindrical. In some embodiments, the cylinder has a non-circular cross-sectional shape. For embodiments in which an underwater connecting apparatus includes a connector part, the connector part may be configured to receive a contact pin that enters the connector part in the axial direction. For embodiments in which the underwater connecting apparatus is a cable termination apparatus, the cable may extend into the chamber in the axial direction.

Since the flexible diaphragm has a wall with a non-circular perimeter, the profile of the wall may move closer to a circular profile when the volume of the chamber increases to accommodate the increase in volume without substantially changing the length of the perimeter. In some embodiments, this may be achieved with a profile having substantially straight sides interconnected by rounded corners (e.g., three or four such straight sides).

In some embodiments, the perimeter may be provided with at least one groove to form the non-circular profile. In such embodiments, a groove, as viewed from outside of the chamber, may move outwardly if the volume of the chamber increases. If the volume of the chamber decreases (e.g., when the apparatus is taken from above water to underwater) and external pressure increases, the region adjacent to a groove, as viewed from the outside of the chamber, may move inwardly. In some embodiments, a plurality of grooves is provided. The grooves may be adjacent to each other or they may be spaced from each other along the perimeter.

If the chamber is regarded as extending in an axial direction, the groove (or each groove if there is a plurality) may extend in the circumferential direction normal to the axial direction. In some embodiments, the groove (or each groove) extends in the axial direction. In some embodiments, the wall may be fluted.

In some embodiments, the wall perimeter of the flexible diaphragm has a wave-shaped profile. In this case, if the volume of the chamber increases, then a trough of a wave, as viewed from outside of the chamber, may move outwardly. If the volume of the chamber decreases, and external pressure increases, the peak of a wave, as viewed from the outside of the chamber, may move inwardly.

In some embodiments, the wave-shaped profile of the wall perimeter may extend over part of the perimeter or over the entire perimeter. In some embodiments, the waves of the wave-shaped profile of the wall perimeter may all be the same. In some embodiments, the waves of the wave-shaped profile of the wall perimeter may all have the same amplitude. In some embodiments, the waves may all have the same period (e.g., the same width).

In some embodiments, the wall perimeter has a wave-shaped profile with waves of dissimilar shape. Such a configuration may be used to predetermine the manner in which the flexible diaphragm will deform when the volume of the chamber changes.

The wall perimeter may have a wave-shaped profile in which adjacent waves are dissimilar. In some embodiments, one wave is stiffer than another when the waves are subjected to loading caused by a change in volume of the chamber. In some embodiments, the dissimilarity of adjacent waves may include a wave peak having a smaller width than an adjacent wave peak. In some embodiments, a wave peak may have a greater curvature (e.g., a smaller radius) than an adjacent wave peak. In some embodiments, a wave peak with a greater curvature than an adjacent wave peak may have a greater height than an adjacent wave peak.

In some embodiments, the wall perimeter has a wave-shaped profile, where at least one wave peak of a first curvature is located between two wave peaks of a second curvature. In some embodiments, the second curvature is larger than the first curvature. By increasing the curvature of a wave peak, the corresponding portion of the wall perimeter tends to retain its shape when the volume of the chamber changes. The wave peak of greater curvature may be stiffer than a wave peak of smaller curvature.

By forming the wall perimeter with a wave-shaped profile in which a wave peak with a first smaller curvature is located between two larger curvature wave peaks, the portion of the wall perimeter corresponding to the wave peak with the first smaller curvature tends to move inwardly when there is reduction in chamber volume, whereas the portions of the wall corresponding to the wave peaks of the second larger curvatures remain relatively stable. When there is an increase in chamber volume, the portions of the wall perimeter corresponding to the troughs on each side of the wave peak with the first smaller curvature tend to move outwardly, whereas the portions of the wall corresponding to the wave peaks of the second larger curvatures remain relatively stable. Thus, with such a configuration, the wall perimeter responds predictably to volume changes. The cross-sectional shape of the wall perimeter may remain rotationally symmetrical during volume changes rather than deforming asymmetrically. Asymmetric deformation may bring the wall into contact with components inside the chamber, which is undesirable.

In some embodiments, a single wave peak of a first curvature is located between two wave peaks of a second curvature larger than the first curvature. In some embodiments, two or more wave peaks of a first curvature are located between two wave peaks of a second curvature larger than the first curvature. In some embodiments, two wave peaks of a first curvature are located between two wave peaks of a second curvature larger than the first curvature.

In some embodiments, the wall perimeter may have a wave-shaped profile with nine wave peaks as viewed from the outside of the chamber. In some embodiments, three wave peaks having a larger curvature are each separated from one another around the perimeter by two wave peaks of the first smaller curvature. Such embodiments may be useful when there are three components inside the chamber that extend perpendicularly to the wave-shaped profile of the wall as viewed in cross section (e.g., a three cable termination apparatus). Each cable may be positioned inwardly of and adjacent to a portion of the wall corresponding to a wave peak of the second larger curvature.

In some embodiments, the underwater connecting apparatus includes a longitudinally extending member (e.g., a cable) that extends into the chamber and is located radially inwardly of and adjacent to a part of the wall perimeter that is concave as viewed from the inside of the chamber. For configurations in which the wall perimeter has a profile with straight sections connected at rounded corners as described above, the longitudinally extending member may be located radially inwardly of and adjacent to a rounded corner. For a wall perimeter with a wave-shaped profile, the longitudinally extending member may be located radially inwardly of and adjacent to a concave part of the wall perimeter as viewed from the inside of the chamber. The concave part is formed by a wave peak as viewed from the outside of the chamber.

In some embodiments, at least two longitudinally extending members (e.g., cables) extend into the chamber. A first longitudinally extending member is located radially inwardly of and adjacent to the concave part of the wall perimeter that is formed by one of the two wave peaks of the second curvature. A second longitudinally extending member is located radially inwardly of and adjacent to the concave part of the wall perimeter that is formed by another of the two wave peaks of the second curvature.

The apparatus may include more than one chamber. The chamber (or each chamber if there is a plurality of chambers) may have a flexible diaphragm that defines a wall having a perimeter with a non-circular profile. In some embodiments, there is a first chamber having a flexible diaphragm defining a wall. The flexible diaphragm is exposed on an outer surface thereof to pressure in a second chamber that also has a flexible diaphragm defining a wall. The flexible diaphragm of the second chamber is exposed on an outer surface thereof to external ambient pressure or to pressure in a third chamber. Thus, the flexible diaphragm of the first chamber may provide pressure balancing between the first chamber and the second chamber. The flexible diaphragm of the second chamber may provide pressure balancing between the second chamber and the outside pressure (e.g., ambient pressure or the pressure in the third chamber).

In such a configuration, the flexible diaphragm of the first chamber may define a wall having a perimeter with a non-circular profile. In some embodiments, the flexible diaphragm of the second chamber defines a wall having a perimeter with a non-circular profile. The third chamber, if one is provided, may also have a flexible diaphragm defining a wall having a perimeter with a non-circular profile.

In some embodiments, the chamber (or each chamber if there is a plurality) may contain a fill material (e.g., a polymeric solid, such as a silicone elastomer or a fluid, such as an oil or gel).

For embodiments in which there is more than one chamber and a connection between electrical conductors and/or optical conductors, the connection may be made in the first chamber. The first chamber may contain a fill material (e.g., a polymeric solid, such as a silicone elastomer, or a fluid, such as an oil or gel).

In a third aspect, underwater connecting apparatuses and assemblies are provided that have an improved flexible diaphragm.

It is known to terminate an underwater cable at a bulkhead of a subsea installation, the back end of an underwater connector, or a harness that provides an intermediate unit between a cable and another cable or subsea installation or connector. It is also known to provide underwater connectors having a first connector part and a second connector part provided with respective contact terminals for engagement (e.g., interengagement) in a mated condition of the connector. Such underwater connectors may be wet mateable connectors (e.g., mateable underwater) or dry mate connectors (e.g., connectable in dry conditions before being taken underwater).

In each of the above-described cases, a protected environment may be provided around an area where one electrical conductor makes an electrical connection with another electrical conductor. GB 2192316A describes an example of an underwater connector having a protected environment where a connection between electrical terminals of respective connector parts may take place. The protected environment is provided in a chamber having a wall formed by a boot or flexible diaphragm. The boot is filled with a fluid, such as an oil or gel. The boot is exposed on an outside surface to pressure outside of the chamber. Since the boot is flexible, the boot provides pressure balancing between the inside of the chamber and the region outside of the chamber.

It is also known to provide a protected environment around an underwater cable termination (e.g., the region where a cable conductor is electrically connected to another component) by forming a solid electrical insulation body around the conductors. The solid electrically insulating body may be made of a polymeric or ceramic material. The solid electrically insulating body is surrounded by a bath of fluid contained in a chamber having a flexible diaphragm that defines a wall of the chamber. The flexible diaphragm has an outer surface exposed to pressure outside of the chamber, thereby providing pressure balancing between the external pressure and the pressure inside the chamber. The intention is to suppress the ingress of water or other contaminants into the chamber.

In accordance with a third aspect, an underwater connecting apparatus that includes a flexible diaphragm that defines a wall of a chamber configured for receiving therein an electrical conductor and for containing an electrically insulating material around the conductor is provided. The flexible diaphragm includes an electrically conductive material.

Because the flexible diaphragm includes an electrically conductive material, the flexible diaphragm is able to provide an electrical screen or shield around the chamber and, therefore, around the electrical conductor. At the same time, the flexibility of the diaphragm enables the chamber to experience volume changes in response to stimuli (e.g., temperature or pressure variations).

In some embodiments, the underwater connecting apparatus may be an underwater connector. In some embodiments, the underwater connecting apparatus may include a first connector part configured for engagement with a second connector part to effect an electrical connection. The electrical connection may take place in the chamber and be between respective electrical conductors. The electrical conductors may be contact terminals. In some embodiments, the electrical conductor may be a contact terminal located in the chamber (e.g., a contact socket). In some embodiments, the connector may be a wet mateable connector (e.g., mateable underwater). In other embodiments, the connector may be a dry mate connector (e.g., mateable in dry conditions before being taken under water).

In some embodiments, the underwater connecting apparatus may provide a cable termination for terminating a cable at another item (e.g., the back of a connector part, a bulkhead, or a cable harness for connecting one cable to another). The cable may extend into the chamber. The electrical conductor may be connected in the chamber to a second electrical conductor belonging to the cable. The electrical conductor may be a contact terminal for engagement with the second electrical conductor of the cable (e.g., a crimp sleeve).

In some embodiments, the apparatus includes a first electrical conductor, and the chamber is configured to receive a second electrical conductor to make an electrical connection with the first electrical conductor in the chamber. The first electrical conductor and the second electrical conductor may be respective contact terminals of a first connector part and a second connector part. The second electrical conductor may be the conductor of a cable, and the first electrical conductor may be a contact terminal of the apparatus.

The underwater connecting apparatus may be configured for electrical signal or data transmission. In some embodiments, the electrically conductive flexible diaphragm may serve to screen the signals from interference, or to prevent cross talk between conductors on opposite sides of the flexible membrane. The underwater connecting apparatus may be configured to handle relatively low voltages (e.g., a peak or maximum of 1 kV or less).

In some embodiments, the underwater connecting apparatus is configured for electrical power transmission. The underwater connecting apparatus may be configured to handle alternating root mean square (RMS) voltages (e.g., up to 5 or 10 or 20 or 30 or 40 or 50 or 60 or 70 or 80 or 90 or 100 or 110 or 120 or 130 or 140 kV or above).

In some embodiments, the flexible diaphragm is configured to be earthed in use. Since the flexible diaphragm includes an electrically conductive material, an electric field may be contained within the chamber. In use, when the electrical conductor is received in the chamber and is connected to an electrical source, an electric field is generated around the conductor. The strength of the electric field decreases with distance away from the conductor. If the flexible diaphragm is earthed, the electric field reduces to zero at the diaphragm. The electrically insulating material contained in the chamber is subject to electrical stress due to the electric field gradient. The region outside of the electrically conductive flexible diaphragm is shielded from the electric stress.

This is unlike conventional equipment in that pressure balancing fluids outside of the electrically insulating material around the conductor are also subject to electrical stress and effectively form part of the electrical insulation system. As a result, the pressure balancing fluids have properties of a dielectric insulator. The dielectric quality of a pressure balancing fluid may degrade over time due to water ingress (e.g., due to water permeating through elastomeric seals or bladders, multiple wet mate connections, or catastrophic failure of any of the sealing components of the equipment). If water leaks into the pressure balancing fluids, the electrical gradient may create a tendency for the water to spread out over a myriad of paths (e.g., "water treeing"). Loss of dielectric performance of the pressure balancing fluids may lead to a reduction in electrical performance of the equipment and, eventually, electrical failure. The provision of an earthed electrically conductive flexible diaphragm addresses the above-described problems.

The flexible diaphragm may be made from electrically conductive materials, such as those used in the on shore electrical power and distribution industry. In some embodiments, the electrically conductive material of the flexible diaphragm may be an electrically conductive silicone rubber. In some embodiments, the electrically conductive material is Powersil 440 available from Wacker Chemie AG.

The electrically conductive flexible diaphragm may extend in an axial direction and may form at each axial end a seal with another component (e.g., a seal holder). The flexible diaphragm may be substantially cylindrical. In some embodiments, a substantially cylindrical flexible diaphragm may be used in a wet mateable connector having a first part and a second part in which an electrical connection is established in the chamber provided in one of the connector parts.

The electrically conductive flexible diaphragm may be configured to engage with a radially outwardly facing surface of a member extending axially into the chamber. In some embodiments, the engagement is a sealing engagement. The member may be a cable that extends into the chamber. The radially outwardly facing surface may belong to a cable screen of a cable. The cable screen may be earthed. In some embodiments, the electrically conductive flexible diaphragm may effectively provide a continuation of the cable screening. At the other end of the chamber, the flexible diaphragm may be held in a sealing manner in electrical engagement with a conductive body that is also earthed. Inside the chamber, the insulating material will be subject to electrical stress in use. By contrast, the region outside of the flexible diaphragm is shielded from electrical stress.

In some embodiments, the chamber extends in an axial direction and has a diameter at one axial end that is smaller than at the other axial end. In the case of an electrically conductive flexible diaphragm that engages with a radially outwardly facing surface of a member extending axially into the chamber (e.g., a cable), the engagement may take place at the axial end of smaller diameter. In some embodiments, the engagement at the axial end of smaller diameter is a sealing engagement. The diameter at the other axial end is larger and creates space radially outwardly of the member (e.g., cable) for the insulating material. The larger diameter end of the flexible diaphragm may seal to a seal holder (e.g., an electrically conductive body).

The apparatus may further include the insulating material. In some embodiments, the insulating material is a polymeric solid material (e.g., silicone elastomer). In some embodiments, the insulating material may be a fill material. In some embodiments, the insulating material may be introduced into the chamber in a flowable form, after which the material solidifies. By introducing the material in flowable form, the presence of air pockets in the chamber may be avoided or minimized. If air pockets are subjected to a high electrical stress (e.g., when the apparatus is used at high voltages), arcing and potential failure of the apparatus may result.

The electrically insulating material may be chosen for its insulating properties and its ability to withstand electrical stress. Any material outside of the flexible diaphragm may be chosen for other properties (e.g., to provide pressure balancing between external ambient pressure and the pressure in the chamber).

In some embodiments, the chamber is a first chamber, and the flexible diaphragm has an outer surface exposed to pressure in a second chamber. In some embodiments, the flexible diaphragm may provide pressure balancing between the first chamber and the second chamber. The second chamber may be filled with a fluid (e.g., an oil or gel). In some embodiments, the second chamber is provided with a second flexible diaphragm that defines a wall of the second chamber. The second flexible diaphragm has an outer surface exposed to pressure outside of the second chamber. The outside pressure may be the ambient pressure of the underwater environment. In some embodiments, the second flexible diaphragm is exposed to pressure in a third chamber. The third chamber may contain a fluid (e.g., an oil or gel). The third chamber may be provided with a third flexible diaphragm that defines a wall of the third chamber. The third flexible diaphragm may have an outer surface exposed to external ambient pressure.

In the case of a cable termination, a cable may extend longitudinally through the second chamber and into the first chamber. For water to leak into the first chamber by following a leak path along the cable, the water would first have to enter the second chamber before entering the first chamber. In some embodiments, the second chamber provides protection against water ingress for the first chamber. Since the flexible diaphragm that defines the wall of the first chamber has an outer surface exposed to pressure in the second chamber, pressure balancing between the two chambers is provided by the flexibility of the diaphragm. The pressure balancing between the two chambers tends to suppress leakage from the second chamber into the first chamber.

For a cable termination, if a third chamber is provided, a leakage path along the cable may involve water entry first into the third chamber, then into the second chamber and then lastly into the first chamber. In some embodiments, the presence of the third chamber provides additional protection. If the second chamber has a wall defined by a flexible diaphragm the outer surface of which is exposed to pressure in the third chamber, then there is pressure balancing between the second and third chambers. Pressure balancing between the second and third chambers tends to suppress leakage from the third chamber into the second chamber.

If a second or a third chamber is provided and filled with fluid to provide a pressure balancing function, then volume changes caused by temperature and pressure changes may tend to result in stretching of the flexible diaphragm. Therefore, in some embodiments, the wall of the second chamber may have a perimeter with a non-circular profile when the chamber is viewed in cross-section. The non-circular profile allows the volume of the chamber to change without substantially changing the length of the perimeter. Similarly, if a third chamber is provided, then the wall of the third chamber may have a perimeter with a non-circular profile when the chamber is viewed in cross-section. The non-circular profile allows the volume of the chamber to change without substantially changing the length of the perimeter.

In the above-described configurations, the flexible diaphragm is able to permit changes in the volume of the respective chamber due to changes in the surrounding conditions without itself undergoing any significant stretching. As a result, an improved pressure balancing effect between external pressure and internal pressure may be provided. The pressure differential across the respective flexible diaphragm may be reduced as compared to diaphragms having a circular cross-sectional profile. By balancing the pressures to be as close to equal as possible, any tendency for water or other contaminants to enter into the respective chamber is reduced. Moreover, by substantially avoiding a change in length of the perimeter of the chamber wall in response to volume changes, there will be a reduced likelihood of material degradation over time (e.g., caused by fatigue).

In some embodiments, the perimeter of the second chamber wall has a wave-shaped profile. In some embodiments, if a third chamber is provided with a third flexible diaphragm that defines a wall, the perimeter of the third chamber wall may have a wave-shaped profile. In some embodiments, a wave-shaped profile is useful in allowing the volume of the chamber inwardly of the wall to change without substantially changing the length of the perimeter. If the chamber is considered as extending in an axial direction, the wave may extend axially. Grooves formed between peaks of the wave may then extend in the circumferential direction normal to the axial direction. In some embodiments, the perimeter of the respective chamber wall has a wave-shaped profile when viewed in cross section transverse to the axial direction. In some embodiments, the wall of the second chamber and/or the wall of the third chamber has axially extending grooves. In some embodiments, the chamber wall may be fluted.

In some embodiments, the second flexible diaphragm includes an annular seal member configured to engage with a radially inner member in order to form a seal between the second chamber and a region outside of the second chamber. The annular seal member includes a first annularly and axially extending portion that is configured to engage the radially inner member and to extend axially along the radially inner member inwardly into the second chamber, and a second annularly and axially extending portion that is configured to engage the radially inner member and to extend axially along the radially inner member away from the chamber. The first portion of the annular seal member is exposed to pressure in the second chamber. The second portion of the annular seal member is exposed to pressure in the region outside the chamber.

In use, the first annularly and axially extending portion is exposed to the pressure inside the second chamber, and the second annularly and axially extending portion is exposed to pressure in the region outside the second chamber (e.g., the pressure of ambient water, a third chamber if one is provided, or fluid provided in a hose). In each case, the pressure may urge the respective annularly and axially extending portion against the radially inner member to form a seal thereagainst.

In some embodiments, the radially inner member is the jacket of a cable that extends into the apparatus.

In some embodiments, a cable termination assembly is provided. The cable termination assembly includes an apparatus as described above in connection with the third aspect. The cable termination assembly further includes a cable that extends into the chamber having a wall that is defined by the electrically conductive flexible diaphragm. If a second chamber is provided, the cable may extend into the second chamber. Similarly, if a third chamber is provided, the cable may extend into that chamber as well. In some embodiments of an assembly, a cable extends from outside of the apparatus through one or more outer chambers and into an inner chamber that has the wall defined by the electrically conductive flexible diaphragm.

In some embodiments, the flexible diaphragm includes an electrically conductive material configured to engage a conductive screen of the cable.

DETAILED DESCRIPTION

Figure 1:
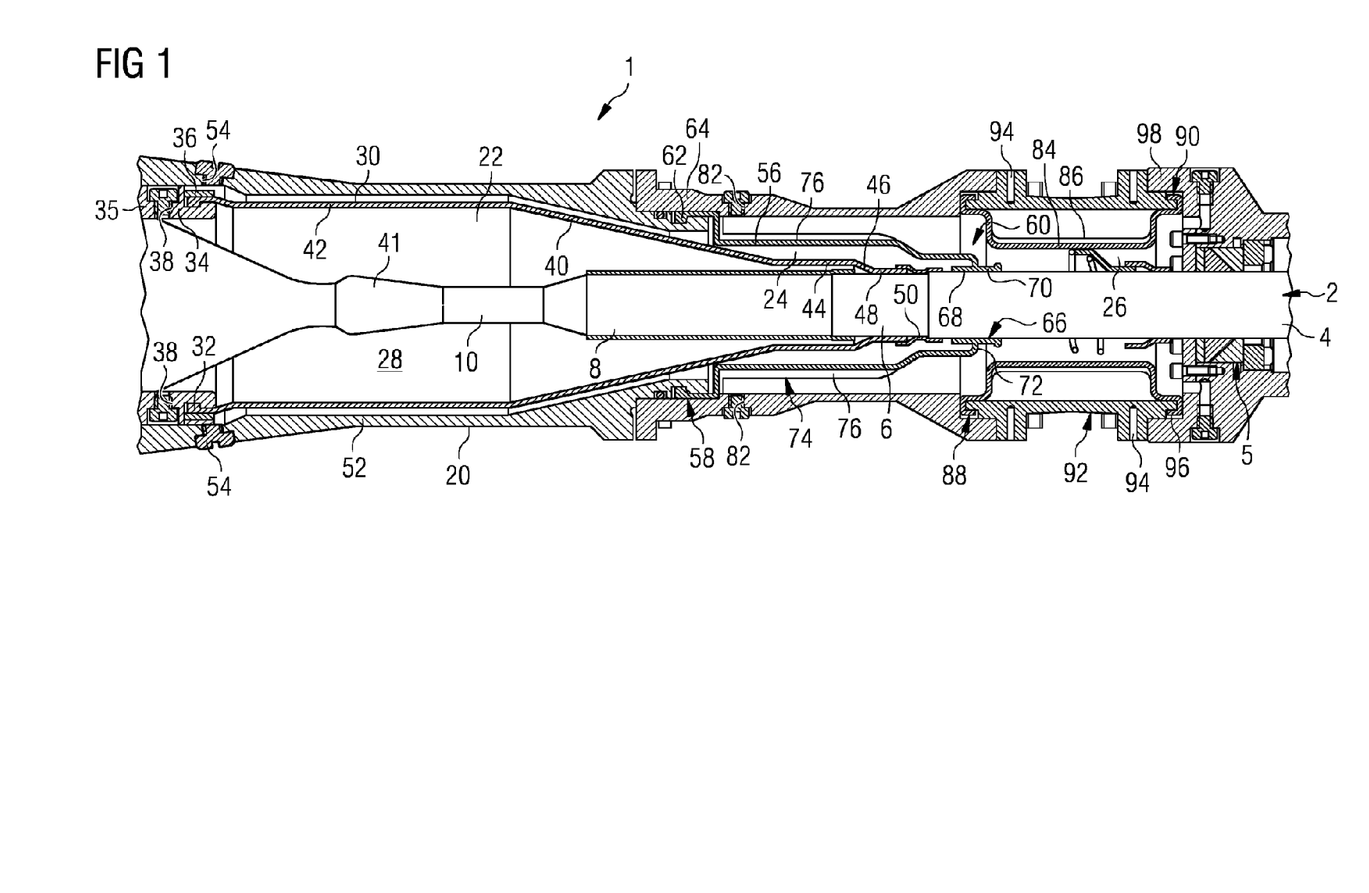
FIG. 1 shows an axial cross-sectional view of an exemplary underwater connecting apparatus according to a first embodiment.

FIG. 1 shows an underwater connecting apparatus 1 for connecting a cable 2 to a bulkhead (not shown) of a subsea installation (not shown). In this embodiment, the underwater connecting apparatus is a cable termination apparatus for an underwater cable, that serves to connect a cable to a conductive core (not shown) that passes across a bulkhead and into a subsea installation. It is intended to be used at high voltages (e.g., with an alternating voltage up to 72 kV peak to peak (51 kV RMS) or 36 kV peak to ground).

The cable 2 is shown in a final configuration when terminated, after the cable 2 has been dressed by stripping back various coaxial layers. The cable 2 includes an external armour (not shown) enclosing a cable jacket that is made of lead and acts as an environmental shield to protect the cable layers inside of the jacket. A semi-conductive screen layer 6 is provided radially inwardly of the cable jacket 4. An insulating layer 8 made of cross-linked polyethylene (XLPE) is provided inwardly of semi-conductive screen layer 6. An inner semi-conductive screen layer 10 is provided inwardly of the insulating layer 8. An inner conductor (not shown) made of copper is surrounded by the inner semi-conductive screen layer 10.

The cable 2 enters the apparatus 1 at the right-hand end as shown in FIG. 1, extending in a forward direction into the apparatus. To the right of the drawing the external armour (not shown) of the cable is gripped in a conventional manner by a strain relief (not shown). The armour is removed forwardly of the strain relief to expose the cable jacket 4 that is sealed by a cone seal 5. The dressing of the cable results in exposure of the screen layer 6 forwardly of where the cable jacket 4 is terminated, exposure of the insulating layer 8 forwardly of where the screen layer 6 is terminated, and exposure of the inner semi-conductive screen layer 10 forwardly of where the insulating layer 8 is terminated. At the forward end of the cable 2, the inner conductor (not shown) is exposed and connects to a conductive core (not shown) that passes across a bulkhead and into a subsea installation.

The cable termination apparatus includes a housing 20 in which three chambers 22, 24 and 26 are provided. An inner chamber 22 is filled with a silicone elastomer fill material 28, and each of an intermediate chamber 24 and a rear chamber 26 contains a pressure balancing fluid (e.g., an oil or gel).

The silicone elastomer fill material 28 in the inner chamber 22 surrounds a cable conductor contact region 41 where the cable conductor makes an electrical connection with the conductive core of the cable termination apparatus. The fill material 28 is contained by a flexible diaphragm 30 that forms a boot around the chamber 22. The flexible diaphragm 30 is made of a conductive material. In some embodiments, the flexible diaphragm 30 is made of a conductive silicone elastomer.

The flexible diaphragm 30 has a large diameter cylindrical portion 42 at a front end around the cable conductor contact region 41. The flexible diaphragm 30 is formed with an annular lip 32 held by a seal holder 34 that is part of a bulkhead mounting plate 35. The lip 32 is restrained by a retaining ring 36. A pair of openings 38 are provided in the bulkhead mounting plate 35 that enable the fill material 28 to be introduced into the chamber 22 in liquid form and for air to escape during such introduction. During assembly of the apparatus, after the chamber has been filled, the fill material solidifies to form an insulating body around the cable conductor contact region 41. The flexible diaphragm 30 has a conical portion 40 that decreases in diameter from the large diameter cylindrical portion 42 in a rearward direction away from the cable conductor contact region 41. The flexible diaphragm 30 joins a smaller diameter cylindrical portion 44. The cylindrical portion 44 is joined to another conical portion 46 that decreases in diameter in the rearward direction to a cable engaging cylindrical portion 48. The portion 48 engages the semi-conductive cable screen layer 6 of the cable 2. In an unstressed condition, the portion 48 has an internal diameter that is slightly smaller than an outer diameter of the screen layer 6 in order to form a good seal and make a good electrical connection. The portion 48 is further held in place by an annular retaining band 50.

The semi-conductive flexible diaphragm 30 makes electrical contact with the cable screen layer 6 at an end of diaphragm 30 that is remote from the cable conductor contact region 41. The semi-conductive flexible diaphragm 30 further makes electrical contact with the seal holder 34 that is part of a conductive bulkhead mounting plate 35 that is to be bolted to the bulkhead (not shown) of the subsea installation. In use, the bulkhead, the bulkhead mounting plate 35, the seal holder 34, the flexible diaphragm 30 and the cable screen 6 will be earthed. The conductor of the cable and the conductive core of the cable termination apparatus to which the cable conductor electrically connects will be operated at a high electric potential (e.g., up to alternating peak-to-peak 72 kV), thereby creating an electric field around these components. The fill material 28 in the first chamber 22 accommodates the electric field created between the high voltage centrally positioned conductors and the earthed wall of the chamber provided by the flexible diaphragm 30. Since the flexible diaphragm is conductive, the flexible diaphragm may shield the region radially outwardly of the flexible diaphragm from electric stress. Because the flexible diaphragm is flexible, the flexible diaphragm is able to deform to accommodate changes in volume of the chamber 22 caused by temperature and pressure variations.

The inner chamber 22 is provided radially inwardly of an intermediate chamber 24 that is filled with a dielectric fluid (e.g., a gel or oil). The purpose of the fluid is to enable pressure balancing between the interior of the chamber and the exterior of the chamber. In the region of the intermediate chamber 24 that is radially outwardly of the cable conductor contact region 41, the chamber has a front housing wall 52 that forms part of the housing 20. The wall 52 is formed with a pair of openings 54 that are used to fill and vent the chamber 24 with fluid during assembly of the cable termination apparatus. Towards the rear of the intermediate chamber 24, the chamber has a wall defined by a flexible diaphragm 56 that forms a boot around the chamber. The flexible diaphragm 56 is made of elastomeric material and is able to flex in response to volume changes inside and outside of the chamber caused by pressure and temperature variations. The flexible diaphragm 56 has a large diameter front end 58 and a small diameter rear end 60. At the front end 58, an annular lip 62 engages in a groove of the front housing wall 52 and is retained there by an intermediate wall 64 of the housing 20.

At a rear end 60 of the flexible diaphragm 56, an annular seal member 66 is formed that engages in a sealing manner with the jacket 4 of the cable 2, thereby sealing the rear end of the chamber 24. The annular seal member 66 has a first annularly and axially extending portion 68 that engages the cable jacket 4 and extends axially and forwardly along the cable jacket into the chamber 24. The first portion of the annular seal member 66 is exposed to the fluid in the chamber and to the pressure of that fluid. The annular seal member has a second annularly and axially extending portion 70 that engages the cable jacket 4 and extends axially along the cable jacket in a rearward direction away from the chamber 24. The second portion of the annular seal member 66 is exposed to fluid in the outer chamber 26 and, hence, the pressure in that chamber. The annular seal member has an intermediate annularly extending portion 72 located between the first and second portions. The intermediate portion 72 is exposed on a forward axial side to pressure in the chamber 24, and on a rearward axial side to pressure in the chamber 26. The intermediate portion 72 extends radially outwardly of the first portion 68 and the second portion 70.

The flexible diaphragm 56 has a generally cylindrical portion 74 that extends rearwardly from the front end 58 towards the rear end 60. The cylindrical portion 74 has a non-circular perimeter and is provided with a plurality of axially or longitudinally extending grooves or flutes 76. The grooves 76 are shown in further detail in FIGS. 2 and 3.

Figure 3:
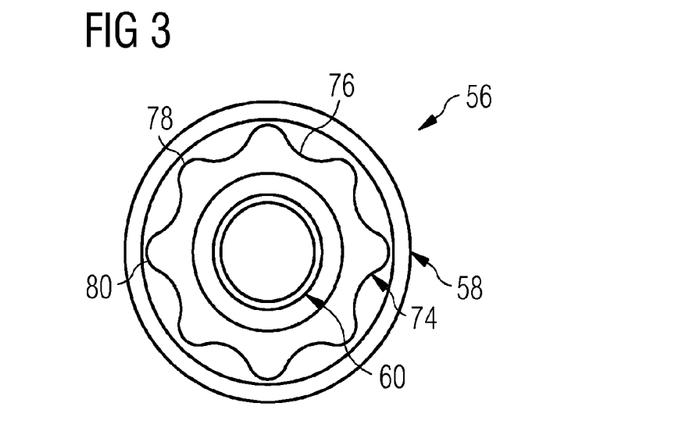
FIG. 3 shows an end view of the boot of FIG. 2.

The perimeter of the cylindrical portion 74 has a wave-shaped profile when viewed in a direction around the perimeter of the cylindrical portion. This wave-shaped profile creates grooves 76 and peaks 78 and 80 on each side of the grooves. As shown by FIG. 3, peaks 78 of the wave have a first curvature and alternate in a direction around the perimeter of the cylindrical portion with peaks 80 of a second curvature that is larger than the first curvature. The grooves 76 are formed between adjacent peaks. The first curvature has a larger radius than the second curvature.

In use, if the volume of the intermediate chamber 24 increases, then the larger curvature peaks 80 remain relatively stable, whereas the portion of the diaphragm corresponding to the groove 76 on each side of a peak 80 moves in a radially outward direction so that the groove becomes shallower. In an extreme case, the diaphragm portions corresponding to a pair of grooves 76 on each side of a smaller curvature peak 78 may move to a radial position similar to that of the peak 78.

If the volume of the intermediate chamber 24 decreases, then the larger curvature peaks 80 remain relatively stable whereas the portion of the diaphragm corresponding to the peak 78 between the peaks 80 moves in a radially inward direction so as to decrease in height. In an extreme case, the diaphragm portion corresponding to a smaller curvature peak 78 may move to a radial position similar to that of the pair of grooves 76 on each side.

By providing at least one smaller curvature wave peak 78 between two larger curvature wave peaks 80, the expansion or contraction of the chamber 24 may take place in a relatively controlled and symmetrical fashion, as compared to an alternative profile in which all wave peaks have the same curvature.

Figure 2:
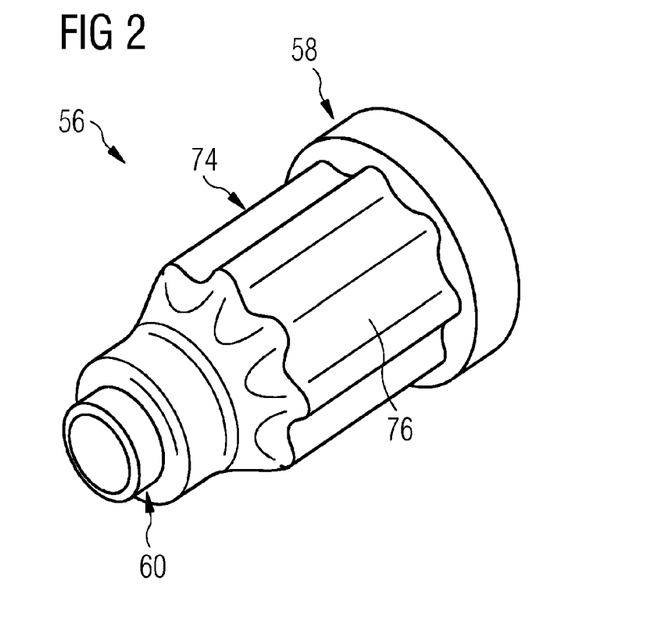
FIG. 2 shows an isometric view of a boot of the apparatus of FIG. 1.

In the case of the flexible diaphragm 56 shown in FIGS. 1, 2 and 3, there are a total of eight wave peaks that include four larger curvature peaks 80 and four smaller curvature peaks 78. The larger and smaller curvature peaks alternate in a direction around the periphery of the diaphragm.

Figure 4:
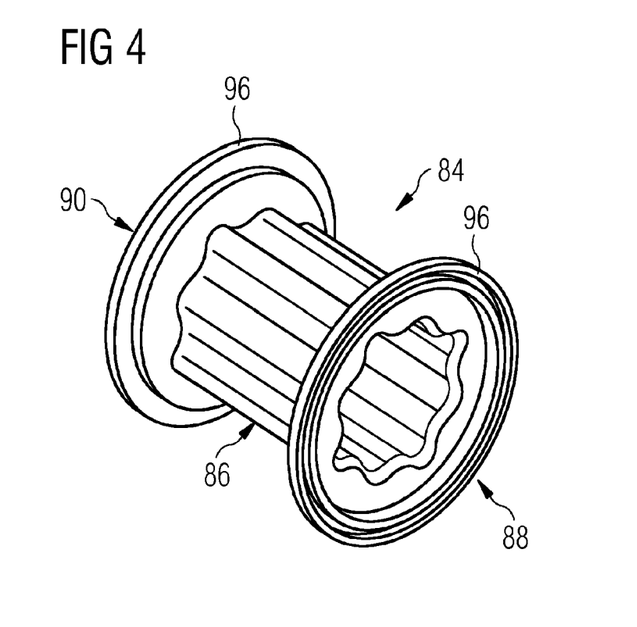
FIG. 4 shows an isometric view of another boot of the apparatus of FIG. 1.
Figure 5:
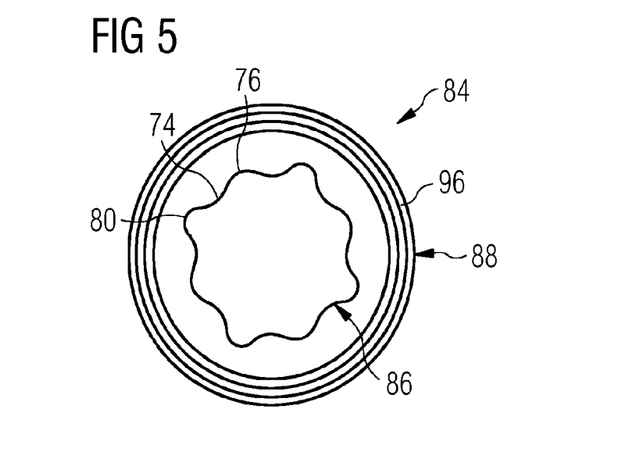
FIG. 5 shows an end view of the boot of FIG. 4.

The rear chamber 26 extends around the intermediate chamber 24 and also around the part of the cable jacket 4 forward of the cone seal 5. The rear chamber 26 contains pressure balancing fluid (e.g., an oil or gel). The intermediate housing wall 64 is formed with a pair of openings 82 configured for introduction of the fluid into the chamber during assembly of the apparatus, and for venting the air from the chamber. The forward part of the rear chamber 26 is defined radially inwardly of the intermediate housing wall 64 and radially outwardly of the diaphragm 56 that defines a wall of the intermediate chamber 24. As shown in FIGS. 1, 4, and 5, a flexible diaphragm 84 is provided at the rear of the rear chamber.

The diaphragm 84 has a generally cylindrical portion 86 extending between a front end 88 and a rear end 90. A rear housing wall 92 is formed radially outwardly of the cylindrical portion 86. Radial passages 94 allow ambient water to enter a region 96 radially inwardly of wall 92 and radially outwardly of cylindrical portion 86. The outside of the cylindrical portion 86 of the flexible diaphragm 84 is thus exposed to ambient water and ambient pressure. The flexible diaphragm 84 is provided at the front and rear ends of the flexible diaphragm 84 with respective sealing lips 96 that are trapped in a sealing manner between the rear housing wall 92 and a part of the housing that is radially outward from the rear housing wall 92. In the case of the front end, the lip is trapped between rear housing wall 92 and intermediate housing wall 64. In the case of the rear end, the sealing lip is trapped between the rear housing wall 92 and a cable collar wall 98.

The cylindrical portion 86 has a non-circular perimeter and is provided with a plurality of axially or longitudinally extending grooves or flutes 76. The grooves 76 are shown in further detail in FIGS. 4 and 5.

The perimeter of the cylindrical portion 86 has a wave-shaped profile as viewed in a direction around the perimeter of the cylindrical portion. This profile creates the grooves 76 and peaks 78 and 80 on each side of the grooves 76. As shown in FIG. 5, peaks 78 of the wave have a first curvature and alternate in a direction around the perimeter of the cylindrical portion with peaks 80 of a second curvature that is larger than the first curvature. The grooves 76 are formed between adjacent peaks.

The manner in which flexible diaphragm 84 functions in response to volume changes of the chamber 26 is similar to that described above in relation to flexible diaphragm 56. By providing at least one smaller curvature wave peak 78 between two larger curvature wave peaks 80, the expansion or contraction of the chamber 26 may take place in a relatively controlled and symmetrical fashion, as compared to an alternative profile in which all wave peaks are the same curvature.

Figure 6:
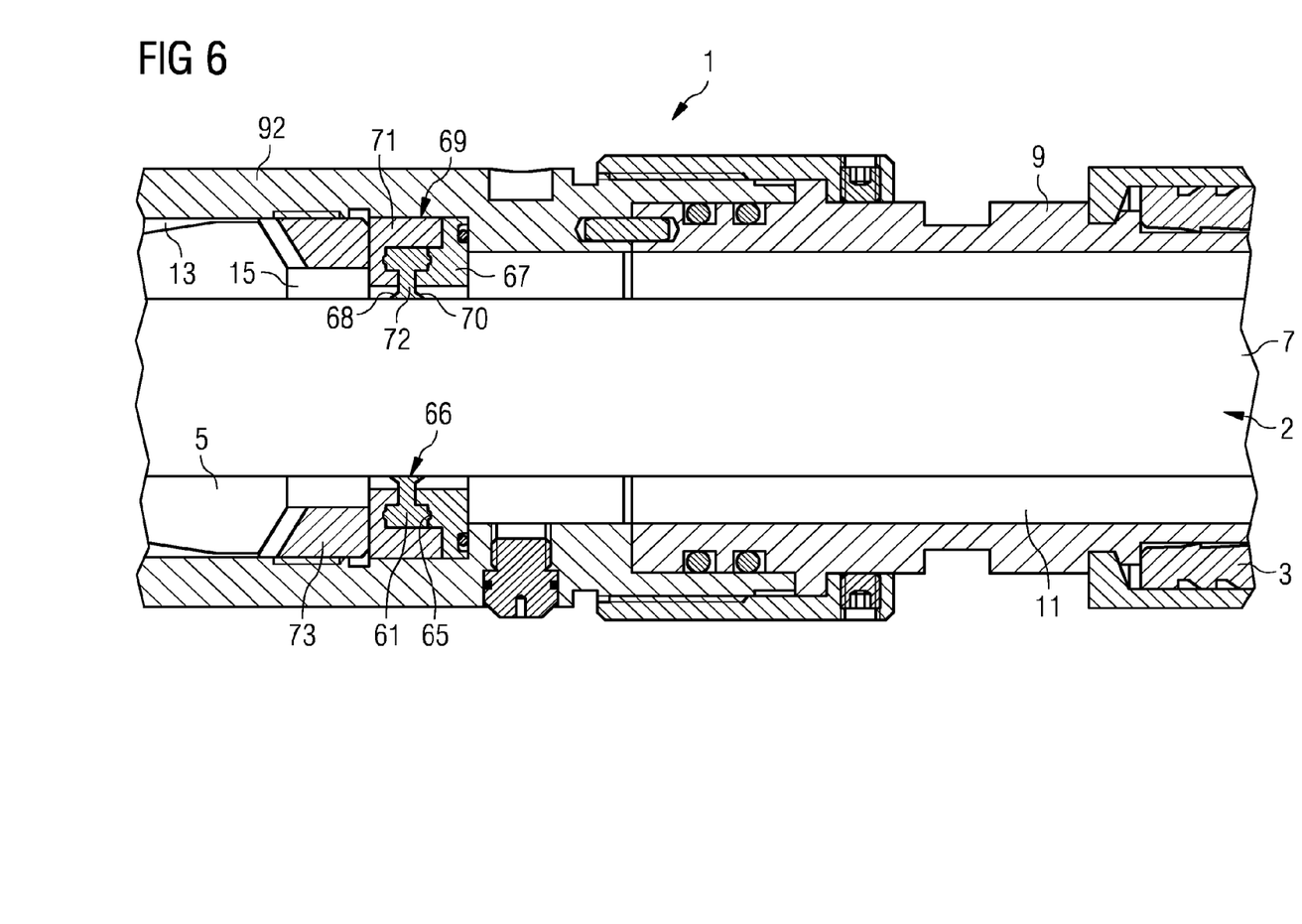
FIG. 6 shows an axial cross-sectional view of part of an exemplary underwater connecting apparatus according to a second embodiment.

FIG. 6 shows a second embodiment of an underwater connecting apparatus 1. As shown by FIG. 6, a front end of an oil filled hose 3 carries a cable 2 having a polymeric cable jacket 7. The front end of the outer casing of the hose 3 connects via an adapter 9 to the rear of the underwater connecting apparatus 1. Only the rear of the apparatus is shown in FIG. 6. Further forwardly, the cable is dressed as in the first embodiment to expose a central conductive core. By way of example, this core may be connected to a connector part, to a conductor of a bulkhead penetrator, or to a conductor of a cable harness. The cable jacket 7 of the cable is gripped by a cable grip 5.

Radially inwardly of the adapter 9 and outwardly of the cable jacket 7, an annular chamber 11 contains oil that is in communication with the oil of the oil-filled hose 3. Forward of the cone seal 5, a chamber 13 that contains fluid (e.g., an oil or gel) is provided. Only the rear of this chamber is shown in FIG. 6. Further forwardly, the chamber 13 has a wall formed by a flexible diaphragm with an outer surface exposed to ambient pressure. The flexible diaphragm provided on chamber 13 provides pressure balancing of the inside of chamber 13 with respect to ambient pressure. The fluid in chamber 13 is in communication with a sub-chamber 15 to the rear of the cable grip 5.

An annular seal member 66 forms a seal between the sub-chamber 15 and the chamber 11. The annular seal member 66 engages in a sealing manner with the cable jacket 7. The annular seal member 66 has a first annularly and axially extending portion 68 that engages the cable jacket 7 and extends axially and forwardly therealong into the sub-chamber 15. The first portion 68 of the annular seal member 66 is exposed on a radially outer surface of the first portion to the fluid in the sub-chamber 15 and to the pressure in the sub-chamber. The annular seal member 66 has a second annularly and axially extending portion 70 that engages the cable jacket 7 and extends axially and rearwardly therealong into the chamber 11. The second portion 70 of annular seal member 66 is exposed on a radially outer surface of the second portion 70 to the oil in the chamber 11 and to the pressure in the chamber.

The annular seal member 66 has an intermediate annularly extending portion 72 located between the first portion 68 and second portion 70. The intermediate portion 72 is exposed on a front axial surface of the intermediate portion 72 to pressure in sub-chamber 15 and on a rear axial surface of the intermediate portion 72 to pressure in chamber 11. The annular seal member 66 has a radially outer annularly extending part 61 that is sealed with respect to a rear housing wall 92 of the apparatus. The part 61 is gripped in a recess 65 defined between a rear part 67 of a seal holder 69 and a front part 71 of the seal holder. The front part 71 is urged rearwardly by a locking ring 73 threadedly engaged with the inside of the rear housing wall 92.

Figure 7:
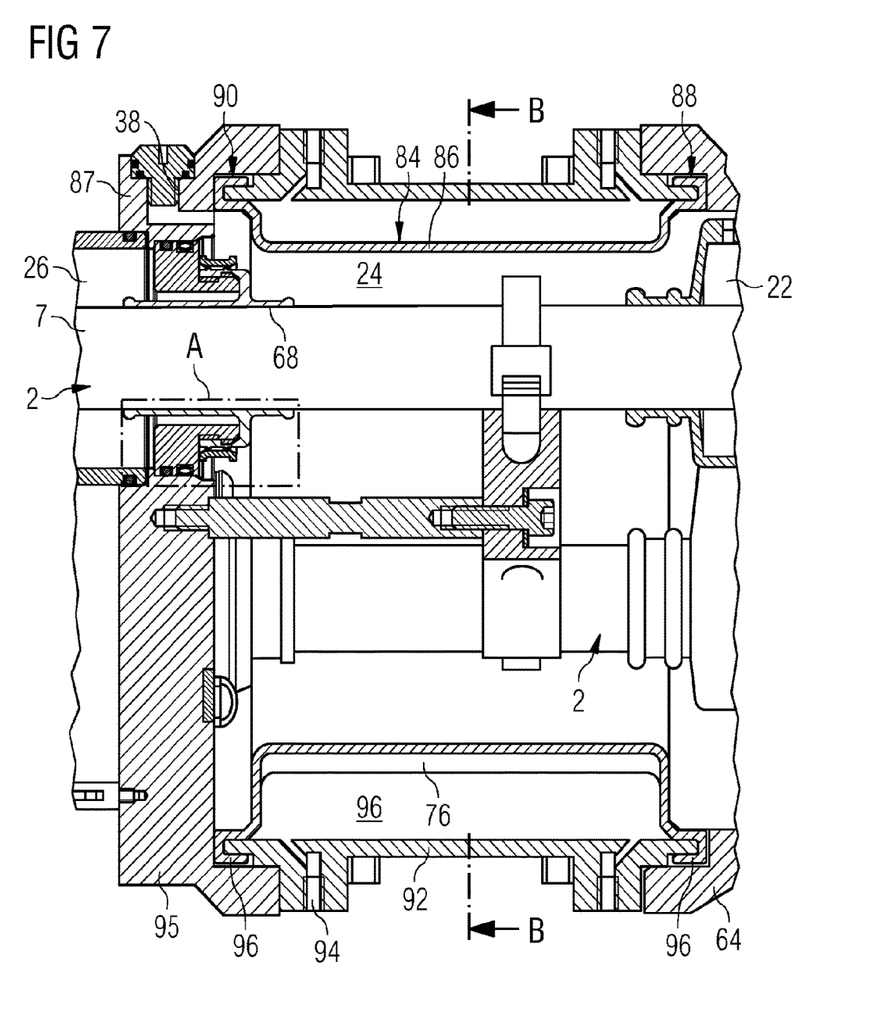
FIG. 7 shows an axial cross-sectional view of part of an exemplary underwater connecting apparatus according to a third embodiment.
Figure 8:
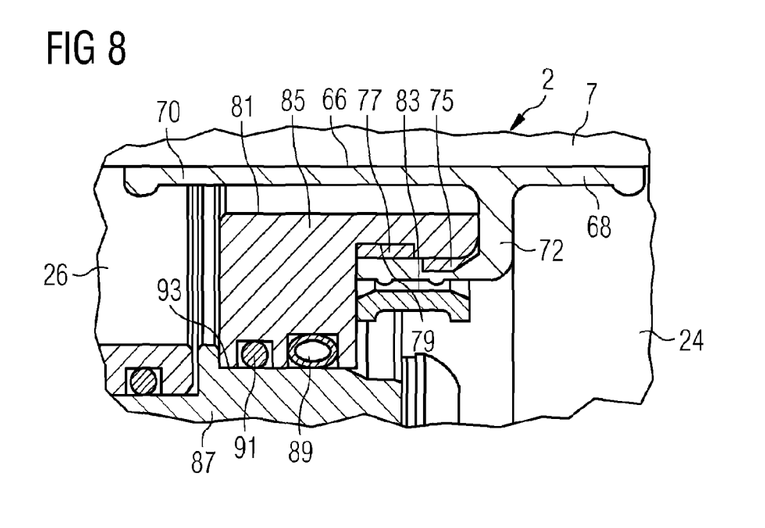
FIG. 8 shows an enlarged view of the portion of FIG. 7 marked "A."
Figure 9:
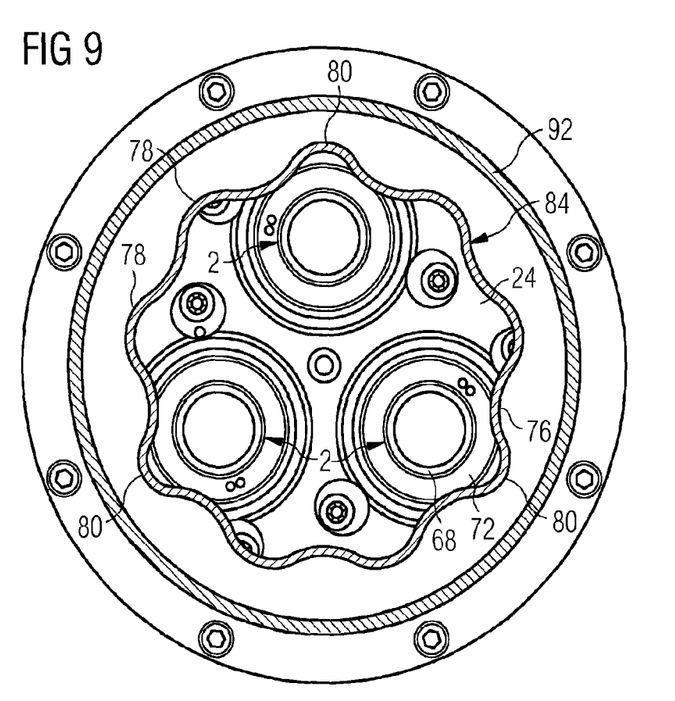
FIG. 9 shows a transverse cross-sectional view of the apparatus of FIG. 7 along the line B-B.

FIGS. 7 to 9 show a third embodiment of an underwater connecting apparatus having an inner chamber 22, an intermediate chamber 24, and a rear chamber 26. Each of inner chamber 22, intermediate chamber 24, and rear chamber 26 is filled with fluid (e.g., an oil or gel). In this embodiment, the apparatus may provide a cable harness in which three relatively heavy duty cables 2 extend forwardly (e.g., from left to right in FIG. 7) from the outside environment to where the three relatively heavy duty cables 2 are dressed to expose a conductive core (e.g., at the right of what is shown in FIG. 7). The conductive core is connected in the inner chamber 22 via a crimp to a conductive pin. The conductive pin is connected via another crimp to a lighter duty underwater cable that is better suited for further connection (e.g., to the rear end of an underwater mateable connector part). The cable is gripped upon entry to the cable harness by a cable grip (not shown, but to the left of FIG. 7) and enters the rear chamber 26. The chamber 26 has a wall formed by a flexible diaphragm (not shown), the outside of which is exposed to ambient water. The pressure in the chamber 26 may be balanced with respect to external pressure in a conventional manner.

The intermediate chamber 24 is provided forwardly of the rear chamber 26. The two chambers are separated by an annular seal member 66, part of which is shown in more detail in FIG. 8. The annular seal member 66 engages with a jacket 7 of the cable 2 to form a seal between chambers 24 and 26. The annular seal member 66 has a first annularly and axially extending portion 68 that engages the cable jacket 7 and extends forwardly and axially along the cable jacket inwardly into chamber 24. The first portion of annular seal member 66 is exposed to the fluid and pressure in the chamber. In some embodiments, a radially outer surface of the first portion 68 is urged by the chamber pressure into engagement with the cable jacket 7. The annular seal member 66 has a second annularly and axially extending portion that engages the cable jacket 7 and extends rearwardly and axially along the cable jacket into chamber 26. The second portion is exposed to fluid and to pressure in the chamber 26. The second portion has a radially outer surface that is exposed to this pressure.

The annular seal member 66 has an intermediate annularly extending portion 72 located between the first portion 68 and the second portion 70. The intermediate portion 72 is exposed on a front axial side to pressure in the chamber 24, and on a rear axial side to pressure in the chamber 26. At the radially outer end of the intermediate portion 72, the seal member 66 has an axially rearwardly extending lip 75 with an annular bead 77 engaging in an annular groove 79 of a seal holder 81. A locking ring 83 holds the lip 75 in position. The seal holder 81 has a main body 85 that engages in a socket 93 of a seal support 87. A canted coil spring 89 holds the seal holder in the socket and an O-ring seal 91 seals the seal holder main body 85 to the socket, thereby preventing fluid communication of chambers 24 and 26 along this path.

The intermediate chamber 24 extends around the three cables 2 forwardly of the annular seal member 66. At least one opening 38 in a housing end cap 95 is provided for introducing fluid into the chamber during assembly of the apparatus, and for venting air from the chamber. As shown in FIGS. 7 and 9, the flexible diaphragm 84 defines a wall of the intermediate chamber 24.

The diaphragm 84 has a generally cylindrical portion 86 that extends between a front end 88 and a rear end 90. A rear housing wall 92 is formed radially outwardly of the cylindrical portion 86. Radial passages 94 allow ambient water to enter a region 96 radially inwardly of wall 92 and radially outwardly of cylindrical portion 86. The outside of the cylindrical portion 86 of the flexible diaphragm 84 is thus exposed to ambient water and ambient pressure. Front and rear ends of the flexible diaphragm 84 are provided with respective sealing lips 96 that are trapped in a sealing manner between the rear housing wall 92 and a part of the housing radially outwardly thereof. In the case of the front end, the lip is trapped between rear housing wall 92 and an intermediate housing wall 64. In the case of the rear end, the sealing lip is trapped between wall 92 and the housing end cap 95.

The cylindrical portion 86 has a non-circular perimeter and is provided with a plurality of axially or longitudinally extending grooves or flutes 76. The grooves 76 are shown in further detail in FIG. 9.

The perimeter of the cylindrical portion 86 has a wave-shaped profile as viewed in a direction around the perimeter of the cylindrical portion. This profile creates the grooves 76, and the peaks 78 and 80 to the sides of the grooves 76. As shown in FIG. 9, peaks 78 of the wave have a first curvature, and peaks 80 have a second curvature that is larger than the first curvature. In a direction around the perimeter of the cylindrical portion, there are two first curvature peaks 78 followed by one second curvature peak. In some embodiments, there are two first curvature peaks between two second curvature peaks 80.

Each larger curvature peak 80 is configured to be located radially outwardly of a respective cable 2. There are a total of nine peaks that include three larger curvature peaks 80 and six smaller curvature peaks 78.

The manner in which flexible diaphragm 84 functions in response to volume changes of the chamber 24 is similar to that described above in relation to flexible diaphragm 56 of the first embodiment. By providing at least one smaller curvature wave peak 78 (and, in this embodiment, two smaller curvature wave peaks 78) between two larger curvature wave peaks 80, the expansion or contraction of the chamber 24 may take place in a relatively controlled and symmetrical fashion, as compared to an alternative profile in which all wave peaks have the same curvature.

In this embodiment, if the volume of the chamber 24 increases, then the larger curvature peaks 80 remain relatively stable, whereas the portions of the diaphragm corresponding to the three grooves 76 between each circumferentially adjacent pair of peaks 80 move in a radially outward direction, such that the grooves become shallower. With further expansion, the diaphragm portions corresponding to the grooves 76 may move to a radial position similar to that of the smaller curvature peaks 78.

If the volume of the intermediate chamber 24 decreases, then the larger curvature peaks 80 remain relatively stable whereas the portions of the diaphragm corresponding to the peaks 78 move in a radially inward direction, so as to decrease in height. With further contraction, the diaphragm portions corresponding to the smaller curvature peaks 78 may move to a radial position similar to that of the grooves 76. Since each larger curvature peak 80 is configured to be located radially outwardly of a respective cable 2, the stability of the peaks 80 may prevent the diaphragm from collapsing inwardly onto the cables even with a decrease in volume of the chamber 24.

While the present invention has been described above by reference to various embodiments, it should be understood that many changes and modifications may be made to the described embodiments. It is therefore intended that the foregoing description be regarded as illustrative rather than limiting, and that it be understood that all equivalents and/or combinations of embodiments are intended to be included in this description.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding claim—whether independent or dependent—and that such new combinations are to be understood as forming a part of the present specification.

The invention claimed is:

1. An underwater connecting apparatus comprising:
   a flexible diaphragm that defines a wall of a chamber, the wall comprising an outer perimeter with a first non-circular profile and an inner perimeter with a second non-circular profile when the chamber is viewed in a cross-section perpendicular to an axial extension of the flexible diaphragm;
   at least one groove on the outer perimeter configured to move outward, the at least one groove at least in part defining the first non-circular profile of the outer perimeter;
   wherein the chamber is configured to comprise a fill material, the wall of the chamber surrounding the fill material in the cross-section;
   wherein the outer perimeter of the wall with the first non-circular profile has a wave-shaped profile, the wave-shaped profile having a plurality of wave peaks, at least one wave peak of the plurality of wave peaks having a first curvature that is different than a second curvature of at least one other wave peak of the plurality of wave peaks; and
   wherein the first non-circular profile of the outer perimeter is configured to allow a volume of the chamber to change without changing a length of the outer perimeter.

2. The apparatus of claim 1, wherein the chamber extends in an axial direction.

3. The apparatus of claim 1, wherein the at least one wave peak of the first curvature is located between two wave peaks of the second curvature, wherein the second curvature is larger than the first curvature.

4. The apparatus of claim 3, further comprising:
   a first longitudinally extending member located radially inwardly of and adjacent to a part of the outer perimeter of the wall that is concave as viewed from an inside of the chamber and that is formed by a first wave peak of the two wave peaks of the second curvature; and
   a second longitudinally extending member located radially inwardly of and adjacent to the part of the outer perimeter of the wall that is concave as viewed from the inside of the chamber and that is formed by a second wave peak of the two wave peaks of the second curvature;
   wherein the first longitudinally extending member and the second longitudinally extending member extend into the chamber.

5. The apparatus of claim 1, further comprising a longitudinally extending member located radially inwardly of and adjacent to a part of the outer perimeter of the wall,
   wherein the part of the outer perimeter of the wall is concave as viewed from an inside of the chamber, and
   wherein the longitudinally extending member extends into the chamber.

6. The apparatus of claim 1, wherein the fill material comprises a fluid.

7. The apparatus of claim 1, further comprising a first connector part configured to interengage with a second connector part to effect an electrical connection, an optical connection, or an electrical and optical connection.

8. The apparatus of claim 7, further comprising an electrical conductor, an optical conductor, or an electrical and optical conductor for making a connection with the second connector part.

9. The apparatus of claim 1, further comprising a cable termination configured for terminating a cable and connecting the cable to a different part.

10. The apparatus as claimed in claim 9, further comprising an electrical conductor, an optical conductor, or an electrical and optical conductor configured for connection with an electrical conductor, an optical conductor, or an electrical and optical conductor of a cable.

11. An underwater connecting apparatus comprising:
    a flexible diaphragm that defines a wall of a chamber, the wall comprising an outer perimeter with a non-circular profile when the chamber is viewed in a cross-section perpendicular to an axial extension of the flexible diaphragm;
    at least one groove on the outer perimeter configured to move outward without altering a length of the outer perimeter, the at least one groove at least in part defining the non-circular profile of the outer perimeter;
    wherein the outer perimeter of the wall has a wave-shaped profile, the wave-shaped profile having a plurality of wave peaks, at least one wave peak of the plurality of wave peaks having a first curvature that is different than a second curvature of at least one other wave peak of the plurality of wave peaks;
    wherein the chamber is configured to comprise a fill material, the wall of the chamber surrounding the fill material in the cross-section; and
    wherein the chamber extends in an axial direction, and the non-circular outer perimeter, as viewed in cross-section, is transverse to the axial direction.

12. The apparatus of claim 11, wherein the at least one wave peak of the first curvature is located between two wave peaks of the second curvature,
    wherein the second curvature is larger than the first curvature.

13. The apparatus of claim 12, further comprising:
    a first longitudinally extending member located radially inwardly of and adjacent to a part of the outer perimeter of the wall that is concave as viewed from an inside of the chamber and that is formed by a first wave peak of the two wave peaks of the second curvature; and a second longitudinally extending member located radially inwardly of and adjacent to the part of the outer perimeter of the wall that is concave as viewed from the inside of the chamber and that is formed by a second wave peak of the two wave peaks of the second curvature;

wherein the first longitudinally extending member and the second longitudinally extending member extend into the chamber.

14. The apparatus of claim 11 further comprising a longitudinally extending member located radially inwardly of and adjacent to a part of the outer perimeter of the wall, wherein the part of the outer perimeter of the wall is concave as viewed from an inside of the chamber, and wherein the longitudinally extending member extends into the chamber.

15. The apparatus of claim 11, wherein the fill material comprises a fluid.

\* \* \* \* \*